United States Patent [19]

Hill et al.

[11] Patent Number: 5,441,090
[45] Date of Patent: Aug. 15, 1995

[54] TREE CUTTING AND WOOD MANIPULATING GRAPPLE

[76] Inventors: Terrence R. Hill, P.O. Box 462, Greelz, Ontario K0A 1Z0, Canada; Bruce A. Hackett, 1811 Groves Rd. R.R. #2, Russell, Ontario, Canada, K4R 1E5

[21] Appl. No.: 189,644

[22] Filed: Feb. 1, 1994

[51] Int. Cl.⁶ ............................................. A01G 23/08
[52] U.S. Cl. ..................... 144/3 D; 83/928; 30/379.5; 144/34 R; 144/2 Z
[58] Field of Search ............. 30/379, 379 S; 144/2 Z, 144/3 D, 34 R:34 E, 336, 339, 335; 83/928

[56] References Cited

U.S. PATENT DOCUMENTS

| | | | |
|---|---|---|---|
| 3,590,760 | 7/1971 | Boyd | 144/338 |
| 4,881,582 | 11/1989 | Ketonen | 144/34 R |
| 4,981,163 | 1/1991 | Westlund | 144/338 |
| 5,107,912 | 4/1992 | Cote et al. | 144/338 |

Primary Examiner—W. Donald Bray
Attorney, Agent, or Firm—Adrian Zahl

[57] ABSTRACT

A gripping apparatus is provided that may be rotatably mounted on a vehicle, comprising an articulated boom with a gripping head rotatably and pivotally mounted thereto. The head is provided with opposable jaws comprising jaw members that apply an even pressure to an object being gripped. A saw may be pivotally mounted to the head. A drive coupling may be provided to provide a continuous rotary link between hydraulic lines on the boom with lines the head. The coupling comprises a coupling body rotatably housed within a sheath with a groove between the coupling body and the sheath. The groove permits fluid to be transmitted from the body to the sheath while they are rotated relative to each other. The boom may be provided with a link joining two of the segments, provided with dual articulated cylinder mounts on opposing sides and capable of permitting approximately 360 degrees of rotation between the segments.

22 Claims, 5 Drawing Sheets

5,441,090

TREE CUTTING AND WOOD MANIPULATING GRAPPLE

FIELD OF THE INVENTION

The present invention relates to a vehicle-mounted boom with a gripping and cutting head, for the removal of trees and tree limbs, in particular in situations where working conditions are restricted.

BACKGROUND OF THE INVENTION

Mechanized tree cutting may be accomplished with an articulated boom, or "knuckle boom" having a tree gripping and cutting head at its end, with the boom and head being driven by a hydraulic or other drive means. Tree cutting in restricted conditions requires the use of a device capable of reaching the head over or under obstacles such as utility lines or structures. Knuckle booms, grippers and fluid-driven saws are well known in the art, particularly for use in forestry operations. However, prior systems for gripping, handling and cutting trees suffer from not having a full range of control in all planes and are not generally suitable for removing trees or tree limbs in restricted conditions.

Typically, the cutting head in a boom-mounted device comprises a set of jaws adapted to grip a tree or log, and a saw or shears mounted to the head. The saw may comprise either a rotary or chain saw, and is pivotable or slidable relative to the jaws, in order to cut through the wood.

An example of a vehicle-mounted boom and cutting head is shown in Canadian Patent 1,224,704 (Gaitten), wherein an articulated boom mounted to a truck is provided with a cutting head at its free end. The cutting head includes a set of jaws for gripping a tree limb or trunk, and a longitudinally-slidable circular saw. However, the Gaitten device does not include a boom having a sufficient degree of articulation to reach around or behind obstructions.

Specific requirements apply to a tree cutting apparatus intended for use in restricted areas. The apparatus must be highly maneuverable, in order that the boom may reach over or under obstructions. The head should be capable of being oriented in any position, much like a human hand, in order to grip and cut a limb or tree in any position. In order to achieve these objects, the head may be mounted on an articulated boom, with a linkage that permits the head to both pivot and rotate in much the same manner as a human arm and wrist permit the hand to be positioned in any orientation. Preferably, the head should be continuously rotatable relative to the boom; this requires the use of a rotary drive coupling to permit the hydraulic lines or other drive and control means driving the head to be coupled with the boom. It is desirable as well for the saw or other cutting implement to pivot or be otherwise displaceable when not in use, in order to prevent damage thereto while the head is grappling the tree or limb. As well, it is desirable for the head to be adapted to gather brush and cut wood for disposal. Preferably, at least one of the segments of the boom should be extensible. As well, one of the joints may be provided with means to pivot by a full, or nearly full, 360 degrees in order to allow the operator to extend the head underneath obstructions, such as power lines, and bring the head upwardly and rearwardly around the obstruction.

It is desirable as well to provide means to prevent the saw blade from binding during and after the cutting process. Binding of the blade often results from uneven contact of the teeth of a gripping head with the wood during the cutting. Where the wood being gripped is uneven, one or more teeth may not touch the wood, allowing the section of wood to move as it is weakened by cutting. This problem may be addressed by providing a means whereby the teeth evenly grip the wood, regardless of its irregularities.

The saw in such a device may not be required if the device is to be used for purposes that do not require cutting, for example the emplacement of utility poles. For these applications, the head need not include a saw.

These and other objects are addressed by the present invention.

SUMMARY OF THE INVENTION

In its broadest scope, the present invention comprises a gripping apparatus that may be rotatably mounted on a vehicle, comprising an articulated boom with a gripping head rotatably mounted thereto. The head is provided with a rotary coupling for the continuous rotation of the head relative to the boom, with the coupling comprising an axle housed within an axle housing extending from the head and the boom. The head is further provided with a pivot for pivotal movement of the head relative to the boom. The head is provided with opposing jaw members linked to drive means that actuate the jaws such that they apply an even pressure to an object being gripped thereby. A saw may be pivotally mounted to the head. A drive coupling may be provided to provide a continuously rotatable link between hydraulic drive conduits extending along the boom with conduits on the head. The drive coupling comprises a coupling body rotatably housed within a sheath. Hydraulic fluid is transmitted through an aperture extending through the coupling body into a groove between the coupling body and the sheath, with the groove communicating with an aperture extending through the sheath. The sheath aperture communicates with a fluid conduit engaged thereto, which may be linked to a jaw member or other component of the head driven by hydraulic drive means.

The invention further comprises a boom and gripping head as described above mounted to a vehicle, and as well a gripping head as described above for engagement to a boom.

The invention further comprises a segmented boom for use with a gripping head. The boom may be provided with a 360 degree pivot link joining two of the segments. The link comprises a rigid link member pivotally engaged at either end thereof to a respective boom segment. Two hydraulic cylinders or other drive means are each pivotally engaged at one end thereof to a respective boom segment and at the other end thereof to an upper and lower articulated mount, respectively, each pivotally engaged to the link member. The boom segments may include an angled portion adjacent the link member to facilitate rotation. A first of said angled portions angles upwardly and a second portion angles downwardly, when viewed from the link member with the boom positioned generally horizontally.

DETAILED DESCRIPTION OF THE PREFERRED EMBODIMENT

Figure 1:
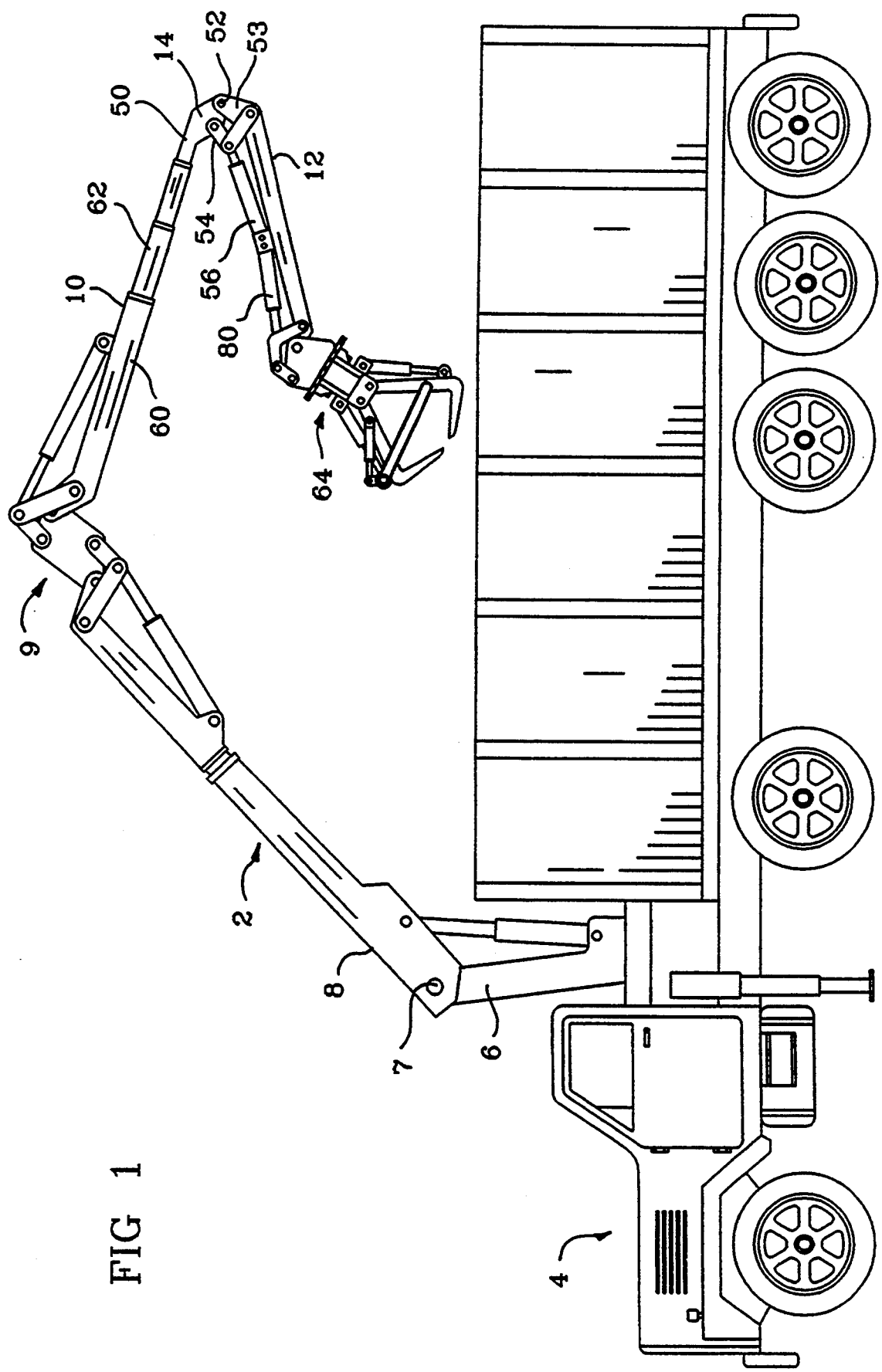
FIG. 1 is a perspective view of a delimbing and removal device according to the present invention, mounted to a vehicle.

Turning to FIG. 1, the boom 2 of the present invention is rotatably mounted at its base to a truck or other large vehicle 4. Hydraulic lines, which are omitted from the drawings herein for clarity, extend to each of the hydraulically-driven cylinders and motors on the boom and cutting head. The hydraulic lines are fed by a pressurized fluid source, not shown, within the truck or mounted thereto and driven by the truck motor. The hydraulic lines are linked to a control unit, not shown, mounted to the truck or the base of the boom and linked in turn to the hydraulic drive. The operator of the device may stand or sit at the base of the boom to operate the boom and cutting head. Alternatively, the operator may operate the device by way of a remote control unit operatively linked by way of a radio signal to the control unit, as is known in the art. The hydraulic lines are preferably housed within the interior of the boom or within holders mounted to the boom that allow the lines to accommodate the pivotal and rotational movement and extensions of the boom. It will be understood that although the preferred embodiment employs a hydraulic drive system, the device may be driven by any means capable of providing sufficient motivating force to drive the boom and cutting head. For example, the hydraulics could be replaced by an air or cable driven system, or an arrangement of electric motors.

Figure 7:
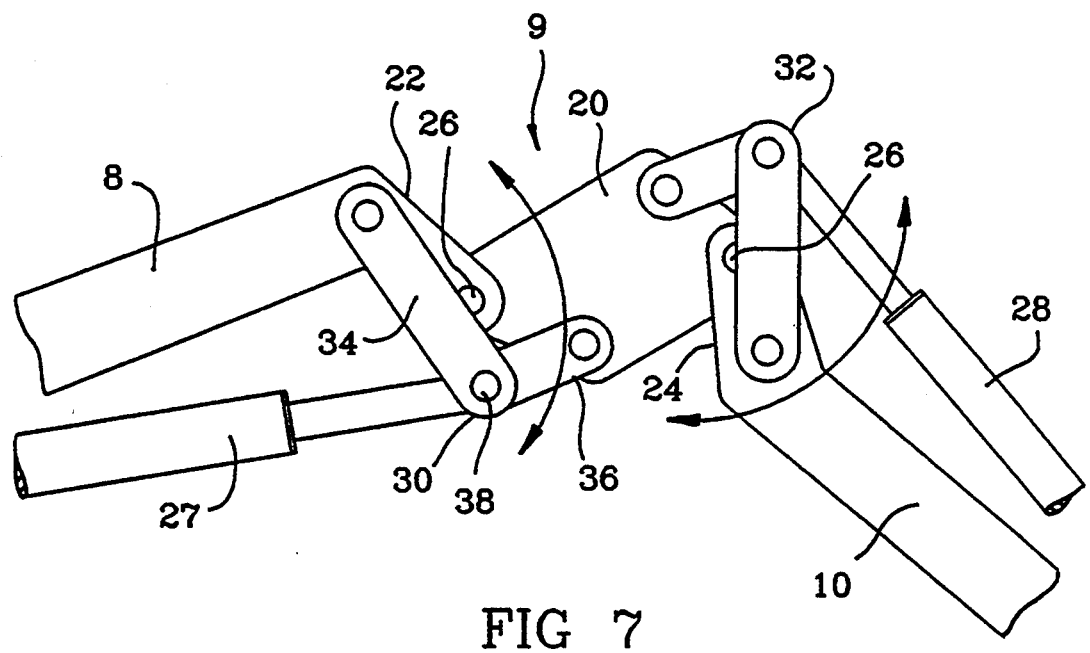
FIG. 7 is a side elevational view of a portion of the boom, illustrating the 360 degree pivot link member.

The boom comprises four articulated segments 6, 8, 10 and 12, respectively, with a first segment 6 comprising the base of the boom and a fourth segment 12 comprising its terminus. The first and second segments are pivotally joined together by way of a pivot pin 7. The second and third segments 8 and 10 are pivotally joined together by way of a 360 degree pivot link 9, illustrated in greater detail in FIG. 7, that permits these segments to pivot by approximately 360 degrees relative to each other. Turning to FIG. 7, the pivot link 9 comprises a generally parallelogram-shaped link body 20 pivotally engaged at its acute corners to respective ends of the second and third boom segments 8 and 10. The link body may comprise a pair of parallel, spaced apart plates linked by rigid connectors, not shown. The boom ends facing the link body 20 terminate in first and second link mounts 22 and 24, respectively, each comprising a pair of tabs that sandwich the link body. A pivot 26 pivotally joins the link body to each link mount. The link mounts 22, 24 are angled relative to the respective booms, with the first mount 22 being angled downwardly and the second mount 24 being angled upwardly, when viewed facing the link body with the boom positioned generally horizontally. Lower and upper hydraulic cylinders 27 and 28 extend from the second and third segments, respectively. The base of each cylinder to a corresponding segment, and its arm is connected to a corresponding articulated cylinder mount 30 and 32, respectively. Each cylinder mount comprises first and second arms 34 and 36 pivotally engaged to each other by way of a central pivot 38. The distal ends of each arm are pivotally mounted to a respective boom segment and to opposing obtuse corners of the link body.

In use, retraction of the lower cylinder in tandem with extension of the upper cylinder folds the third segment inwardly and downwardly until it folds underneath the second segment. Reverse action of the cylinders folds the third segment in the opposite direction, until it is folded over the second segment. The pivotal action of the segments allows the head to be extended underneath and behind obstacles, for example if a limb is positioned above and behind a set of utility lines must be cut, and obstructions prevent the operator from reaching over the lines. In this case, the operator must reach under the lines and manoeuvre the head upwardly and in some cases rearwardly to reach the limb.

Turning to FIG. 1, the third and fourth segments 10, 12 are linked by an elbow link 50 that permits these segments to fold together with about 180 degrees of rotation therebetween. The elbow link 50 comprises a pivot pin 52 linking angled end portions 53 of the respective boom segments. A folding cylinder mount 54 links the respective end portions, with a hydraulic cylinder 56 being pivotally mounted to the central pivot of the cylinder mount.

The articulation of the boom segments allows the cutting head to grip and remove wood from behind obstructions such as utility cables. It will be understood that a boom may be provided having a different number of segments, and still be capable of providing this function, to a greater or lesser degree. The articulation of all segments of the boom is aligned on a single plane, referred to herein as the "boom plane". It will be understood that one or more segments may be offset, in order to facilitate folding of the boom during transport, and lie on a plane parallel to the boom plane.

Pivotal movement of the segments relative to each other is driven by hydraulic cylinders linking adjacent segments and controlled by the control unit. The first segment is rotatably mounted to the truck 4, and is rotated by way of a hydraulic actuator, not shown.

The third segment 10 of the boom is longitudinally extensible, and comprises an outer sleeve 60 housing inner boom members 62. The inner boom members are hydraulically actuated to selectively retract and extend from the sleeve 60.

A rotary coupling connects the end of the fourth segment to a cutting head 64, as shown more particularly in FIGS. 2 through 6, and permits continuous rotation of the head relative to the boom. The directional references used herein refer to the head in the generally downwardly-pointing position illustrated in the drawings, although it will be understood that this component may be positioned in any orientation. In addition to the rotary coupling, a pivot joint between the head and the boom permits the head to be pivoted by 180 degrees on the boom plane. The combination of the rotary coupling and the 180 degree pivot capability of the pivot joint permits the operator to position the cutting head in virtually any position or orientation. The cutting head is engaged to the boom by way of a mount, comprising first and second parallel spaced apart mount plates 70, 72 extending upwardly from a base structure 74. The mount plates sandwich and pivotally engage the end of the fourth segment by way of a pivot pin 76 extending through the plates and the end of the fourth segment. An anchor 78 extends upwardly from the first mount plate 70, and serves as an attachment point for a hydraulic cylinder 80, seen in FIG. 1, which in turn pivots the head on the boom plane. The anchor is comprised of two arms pivotally engaged to each other, with one arm being pivotally engaged to the first mounting plate 70 and the second arm being pivotally engaged to the boom segment 12 adjacent the end thereof. The double pivotal engagement provided by the anchor 78 permits the head to pivot 180 degrees on the boom plane.

Figure 3:
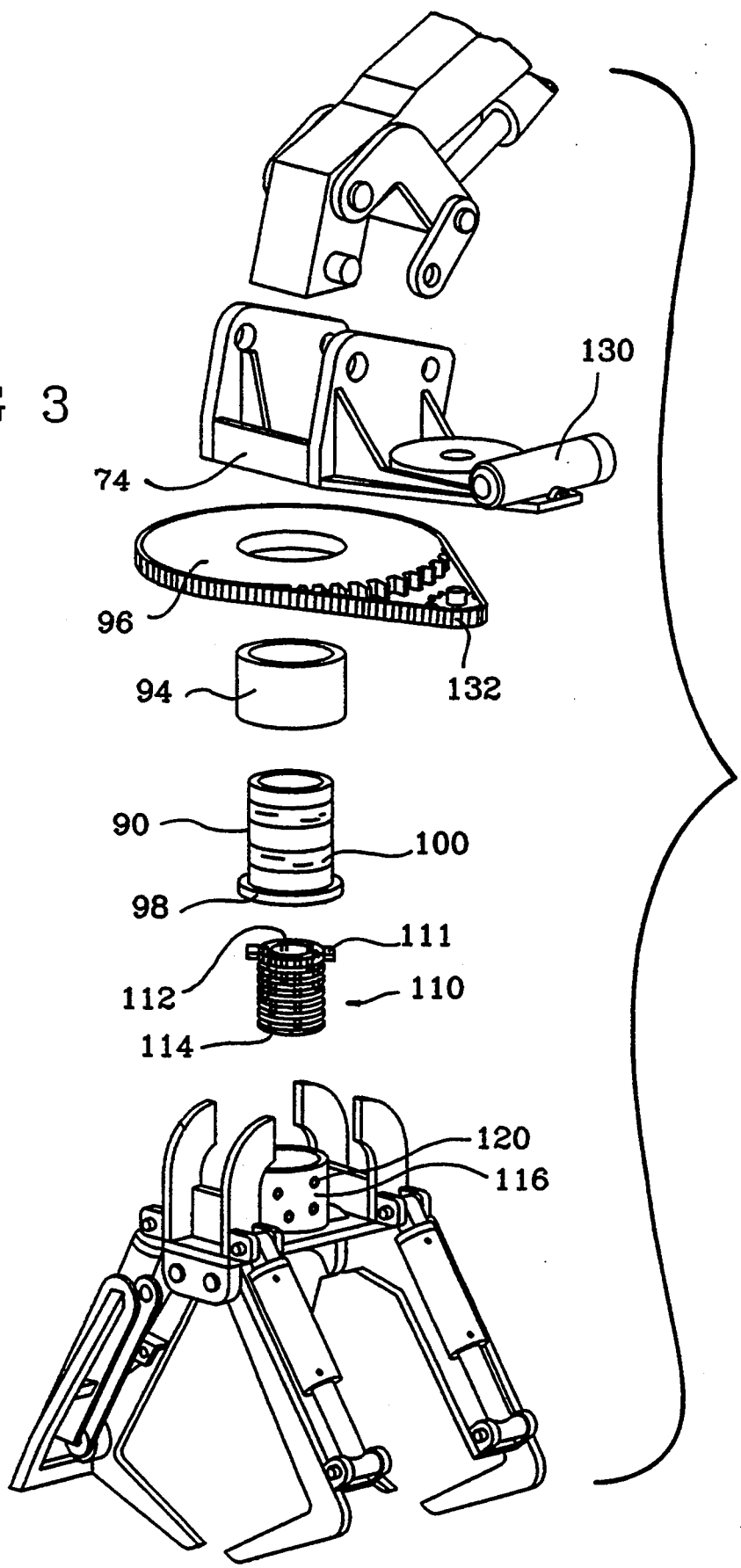
FIG. 3 is an exploded view of the cutting head.

Turning to FIG. 3, the rotary coupling comprises a hollow axle 90 bolted to the lower face of the base structure 74 and extending downwardly therefrom. The axle 90 is housed within a bushing 94 extending downwardly from the lower face of a rotator gear 96, and is held therein by a flange 98 extending outwardly from the lower margin of the axle. An array of annular teflon inserts 100 provide antifriction means between the axle and bushing. The bushing 94 is welded or bolted to the lower face of the rotator gear, and as well is fixedly linked to the lower portion of the head by way of yoke 134 extending outwardly from the bushing and welded to the lower portion of the head, as described in greater detail below.

Hydraulic drive coupling means will now be described that serve to couple the hydraulic conduits on the boom with corresponding conduits on the head and permit continuous rotation of the head relative to the boom. Apertures within the base plate 74 and the rotator gear 96 communicate with the hollow interior of the axle, and permit hydraulic conduits to extend through the axle into the cylindrical body 110 of a rotary coupling positioned partly within the axle and extending from the lower open end of the hollow interior thereof. The rotary coupling body is engaged to the axle by way of tabs 111 extending radially outwardly from the upper rim of the coupling body and that engage corresponding brackets, not shown, extending inwardly from the interior wall of axle. Each hydraulic conduit is connected to an aperture 112 extending through the body 110, and communicating with an annular groove 114 recessed into the face of the coupling body. A coupling sheath 116 surrounds the body and is rotatable relative thereto. In use, the coupling body 110 remains stationary relative to the base plate 74, and the sheath rotates with the drive gear and bushing. Hydraulic fluid entering the apertures 112 passes into the annular grooves 114, and exits the sheath 116 through apertures 120 extending therethrough. Hydraulic conduits, not shown, engaged to the head receive fluid discharged from the apertures to drive the saw and jaws of the head.

The rotator gear 96 is rotatably driven by a hydraulic motor 130 linked to a chain 132 engaged to the toothed rim of the gear.

Figure 2:
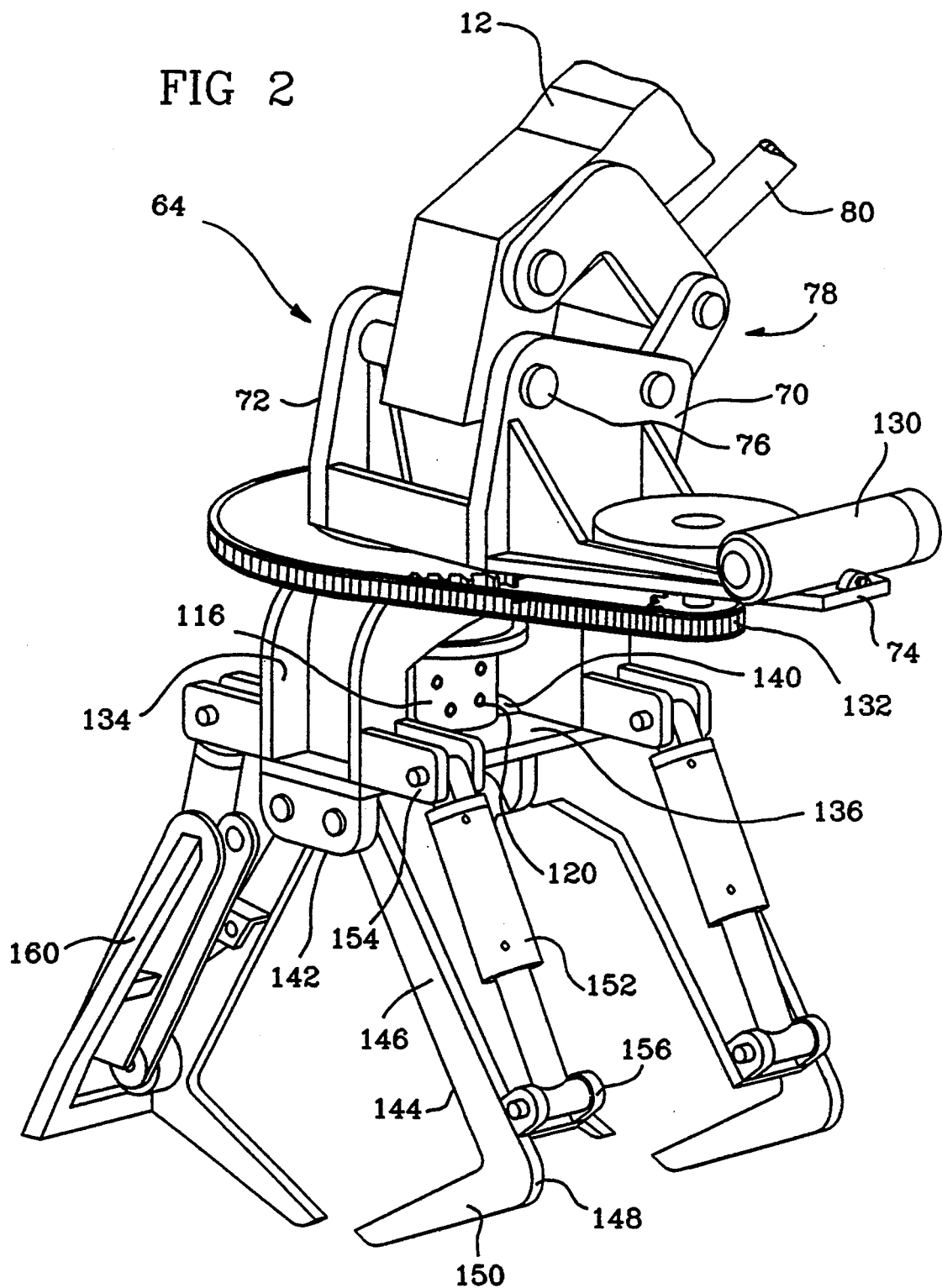
FIG. 2 is a perspective view of the cutting head.
Figure 5:
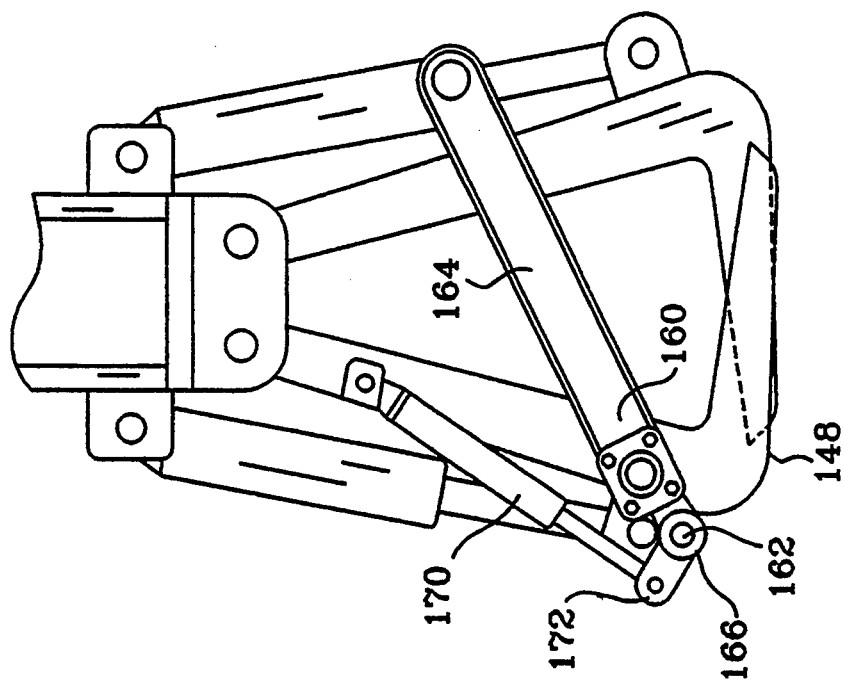
FIG. 5 is a side elevational view of the cutting head, showing the jaws in the partially closed position.

Turning to FIG. 2, the yoke 134 is mounted to the bushing 94 and extends downwardly therefrom. The free lower ends of the yoke engage an elongate base plate 136 that spans the yoke. The coupling sheathing 116 of the rotary coupling is mounted to the base plate by way of brackets 140. Jaw pivot members 142 depend downwardly from each end and the middle of the base plate, each comprising a plate having pivot engagement points at each side thereof to which a jaw member 144 is pivotally engaged. The base plate defines a throat from which the jaw members 144 extend. Each jaw member, comprising a body 146 merging at an elbow 148 with an elongate, inwardly-oriented tooth 150, pivots independently of its neighbours, and is independently actuated by a hydraulic cylinder 152 linking the jaw member with an end of the yoke 134. Opposing jaw members are offset from each other to allow them to grip a small object when drawn together, as seen in FIG. 5. Each cylinder 152 is pivotally engaged at its upper and lower ends to cylinder support brackets 154 and 156, respectively, extending from the lower ends of the yoke and the elbow of the tooth, respectively. The hydraulic lines feeding the cylinders 152 are linked to the main fluid source, not shown. Thus, an even pressure is applied to all the cylinders to actuate the jaw members with an even pressure. Accordingly, if an irregularly-shaped limb is being gripped, the jaw members will all apply an even gripping force. During the gripping operation, the even grip of the jaw members minimizes lateral or rotational stresses that may be placed on the boom or on the limb, and alleviates binding of the saw blade and stress on the device.

Figure 4:
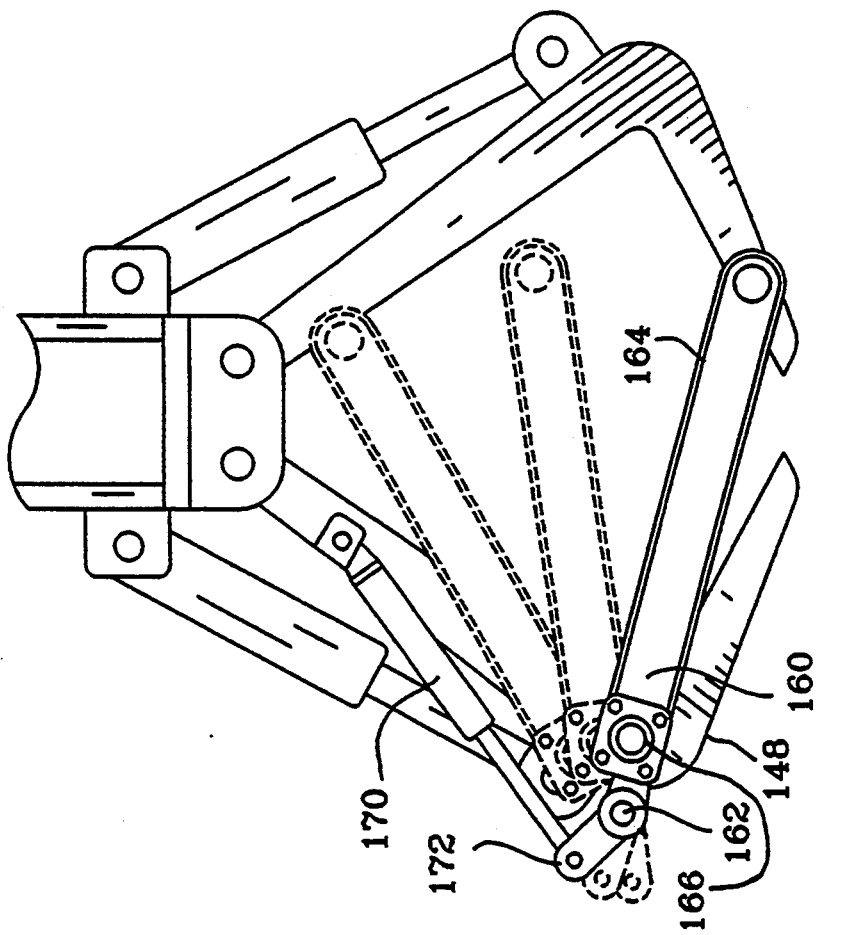
FIG. 4 is a side elevational view of the cutting head, showing the saw blade in alternate positions and with the blade guard removed for clarity.
Figure 6:
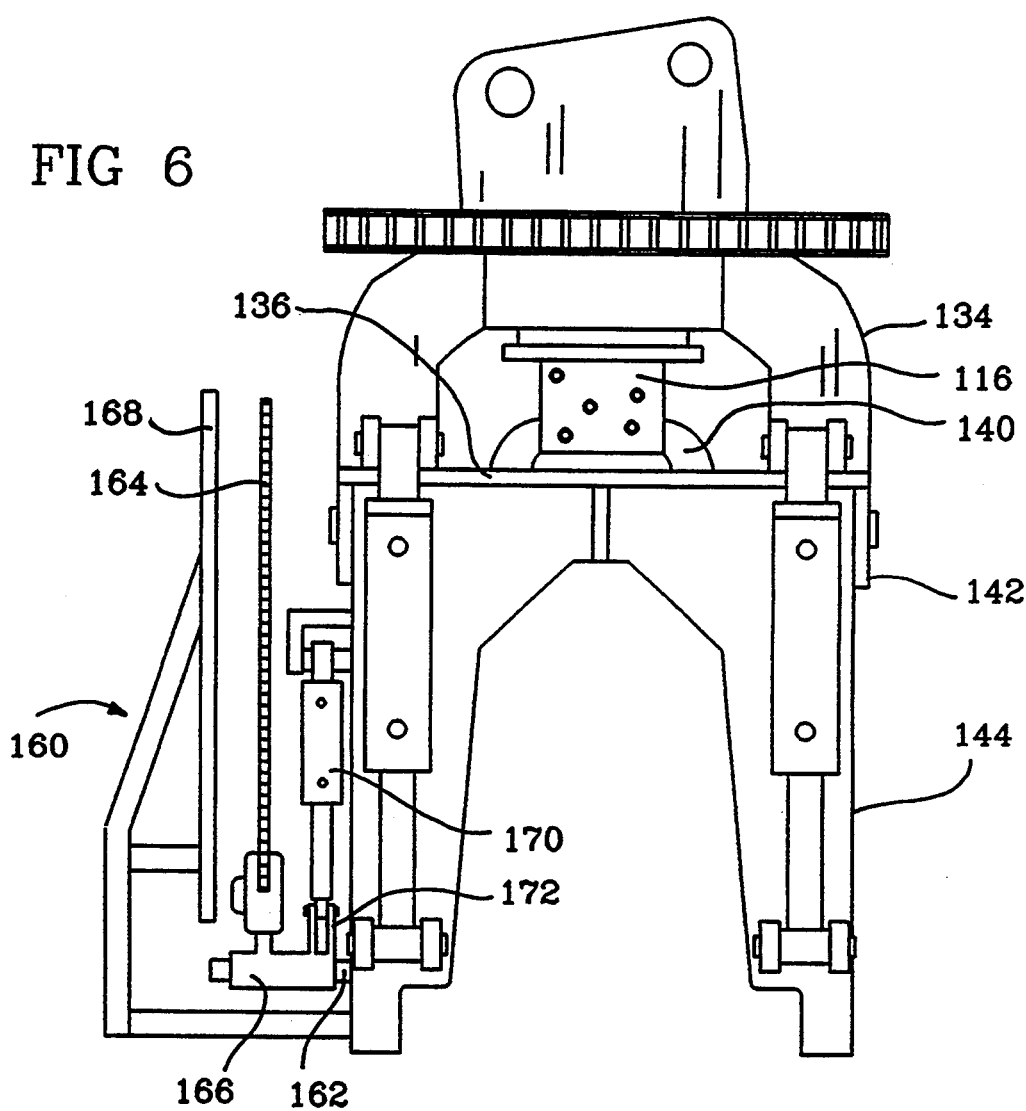
FIG. 6 is a front elevational view of the cutting head.

One of the jaw members is provided at its lower portion with a saw 160, shown more particularly in FIGS. 4, 5 and 6, pivotally engaged to the jaw member by way of a pivot joint 162 adjacent the elbow 148 thereof. The saw includes a chain saw blade 164, driven by a hydraulic motor 166. The chain of the saw may be lubricated by oil drawn from the hydraulic line exiting the saw. A blade guard 168, seen in FIG. 6, is mounted to the elbow 148 and extends parallel to the body 146 of the jaw member and spaced apart therefrom. A support bracket, not shown, may link the guard to the body 146 of the jaw member. The blade guard prevents damage to the blade when the device is grappling tree limbs or is moving wood, when the saw is not in use. Pivotal movement of the saw is effected by a hydraulic cylinder 170 pivotally anchored at its upper and lower ends, respectively, to the body of the jaw member and a reaction arm 172 extending outwardly from the base of the saw 160. In operation, the saw may be pivoted across the face of the jaws and extend below the lower margin thereof. The pivotal movement of the saw is controlled by an operator-controlled pressure regulating valve on the hydraulic cylinder 170, which adjusts the speed with which the saw pivots in response to resistance encountered by the saw as it cuts through the wood.

Although the present invention has been described by way of a preferred embodiment thereof, it will be seen by those skilled in the art that variations may be made to the invention without departing from the spirit and scope thereof, as defined by the appended claims.

We claim:

1. A gripping apparatus for rotatable mounting on a vehicle, comprising a segmented articulated boom and a gripping head rotatably mounted thereto, wherein said boom is provided with multiple articulations and said head comprises: a rotary coupling for rotation thereof relative to the boom; a pivot for pivotal movement of said head relative to said boom; and opposing jaw members, said jaw members each comprising teeth, said teeth each having a base, said teeth each being pivotally mounted at its base to said head and linked to drive means adapted to apply an even force to all of said jaw members to cause said jaw members to evenly grip an object, said rotary coupling comprising an axle rotatably housed within an axle housing mounted to said boom and said head, respectively, for the continuous rotation of said head relative to said boom.

2. An apparatus as claimed in claim 1, wherein there is further provided a saw pivotally engaged to said head.

3. An apparatus as claimed in claim 2, wherein said saw is driven by a hydraulic motor engaged thereto.

4. An apparatus as claimed in claim 2, wherein said saw is pivotally engaged to one of said jaw members at a position spaced apart from the base of said jaw member, whereby said saw is capable of pivoting towards and away from said base for the cutting of a tree limb engaged by said head.

5. An apparatus as claimed in claim 1, wherein said rotary coupling further includes drive coupling means to transmit hydraulic drive means from said boom to said head during continuous rotation of said head relative to said boom, said coupling means comprising a coupling body rotatably housed within a sheath, said coupling body and said sheath both having an aperture extending therethrough communicating with a circumferential groove recessed between said sheath and said coupling body, said apertures and said groove being adapted for the transmission of hydraulic fluid.

6. An apparatus as claimed in claim 1, wherein said drive means comprises pressurized hydraulic fluid fed to hydraulic cylinders engaged to said jaw members.

7. An apparatus as claimed in claim 1, wherein a segment of said boom is longitudinally extensible.

8. An apparatus as claimed in claim 1, wherein said boom includes a linkage connecting adjacent segments thereof, said segments having upper and lower faces, said linkage comprising a linkage body having upper and lower portions, said linkage body be pivotally engaged to both of said segments and having first and second articulated mount arms each having first and second ends, said first arm being pivotally engaged at a first end thereof to said upper portion of said linkage body and said second arm being pivotally engaged at a first end thereof to said lower portion of said linkage body, both of said arms being pivotally engaged at said second end to a corresponding boom segment, said boom further including longitudinally extensible expansion on means extending from said upper and lower faces, respectively, of said boom segments.

9. An apparatus as claimed in claim 8 wherein said linkage body comprises a generally parallelogram-shaped body, the acute corners thereof each being engaged to respective boom segments and the obtuse corners thereof each being pivotally engaged to an end of said mount arms.

10. An apparatus as claimed in claim 8 wherein said adjacent boom segments each include an angled portion facing said linkage body, a first of said angled portion angling upwardly and a second angling downwardly, when viewed from said linkage body with said boom being positioned generally horizontally.

11. An apparatus as claimed in claim 8, wherein said longitudinally extensible expansion means comprises a hydraulically-driven cylinder.

12. A boom comprised of segments pivotally engaged to each other, and having between at least two of said segments adjacent to each other a linkage pivotally connecting said two adjacent segments, said linkage comprising a linkage body pivotally engaged to both of said segments, said segments having upper and lower faces, said linkage comprising a linkage body having upper and lower portions, said linkage body being pivotally engaged to both of said segments and having first and second articulated mount arms each having first and second ends, said first arm being pivotally engaged at a first end thereof to said upper portion of said linkage body and said second arm being pivotally engaged at a first end thereof to said lower portion of said linkage body, both of said arms being pivotally elongated at said second end to a corresponding boom segment, said boom further including longitudinally extensible expansion means extending from said upper and lower faces, respectively, of said boom segments.

13. A boom as claimed in claim 12 wherein said linkage body comprises a generally parallelogram-shaped body, the acute corners thereof each being engaged to respective boom segments and the obtuse corners thereof each being pivotally engaged to an end of said mount arms.

14. A boom as claimed in claim 12 wherein said adjacent boom segments each include an angled portion facing said linkage body, a first of said angled portion angling upwardly and a second angling downwardly, when viewed from said linkage body with said boom being positioned generally horizontally.

15. A boom as claimed in claim 12, wherein said longitudinally extensible expansion means comprises a hydraulically-driven cylinder.

16. A gripping head for mounting on a boom for tree cutting, said head having opposing jaw members comprised of teeth, each of said teeth having a base, said teeth each being pivotally mounted at its base to said head and linked to drive means adapted to apply an even force to all of said jaw members to cause said jaw members to evenly grip an object.

17. A gripping head as claimed in claim 16, having a chain saw pivotally mounted one of said teeth adjacent a free end thereof and adapted to cut tree limbs gripped by said teeth.

18. A vehicle having a tree cutting apparatus mounted to a bed thereof, said apparatus comprising a segmented articulated boom rotatably mounted to the truck and a cutting head pivotally mounted to said boom, said cutting head having a rotary coupling for the continuous rotation thereof relative to the boom and pivotal jaw members linked to drive means adapted to apply an even actuating force to all jaw members to cause said jaw members to evenly grip an object.

19. A vehicle as claimed in claim 18, wherein said boom includes a linkage connecting adjacent segments thereof, said linkage comprising a linkage body pivotally engaged to both of said segments and having dual articulated drive cylinder mount arms each pivotally engaged at one end to upper and lower sides, respectively, of said linkage body, and at the other side to one of said boom segments, respectively, for the attachment of drive means extending from upper and lower faces, respectively, of said segments.

20. A vehicle as claimed in claim 18, wherein said rotary coupling further includes drive coupling means to transmit hydraulic drive means from said boom to said head, said coupling means comprising a coupling body rotatably housed within a sheath, said coupling body and said sheath both having an aperture extending therethrough communicating with a circumferential groove recessed between said sheath and said coupling body, said apertures and said groove being adapted for the transmission of hydraulic fluid.

21. A gripping head as claimed in claim 16, further comprising rotary coupling means adapted to link said head to a boom and permit continuous rotation of said head relative to said boom, said rotary coupling means comprising an axle rotatably housed within an axle housing mounted to said head and mountable to said boom.

22. A gripping head as claimed in claim 21, wherein said rotary coupling further includes drive coupling means to transmit hydraulic drive fluid from said boom to said head, said coupling means comprising a coupling body rotatably housed within a sheath, said coupling body and said sheath both having an aperture extending therethrough communicating with a circumferential groove recessed between said sheath and said coupling body, said apertures and said groove being adapted for the transmission of hydraulic fluid.

* * * * *